United States Patent [19] [11] 4,193,673
Ishiguro et al. [45] Mar. 18, 1980

[54] DIGITAL SHUTTER CONTROL CIRCUIT

[75] Inventors: Yasuo Ishiguro; Kenji Wakazono; Toshihisa Saito, all of Tokyo, Japan

[73] Assignee: Copal Company Limited, Tokyo, Japan

[21] Appl. No.: 913,348

[22] Filed: Jun. 7, 1978

[30] Foreign Application Priority Data

Jun. 10, 1977 [JP] Japan ................................. 52-67982

[51] Int. Cl.$^2$ ............................................ G03B 7/08
[52] U.S. Cl. .............................. 354/23 D; 354/60 A; 354/289
[58] Field of Search .................. 354/23 D, 60 A, 289

[56] References Cited
U.S. PATENT DOCUMENTS

| 4,035,814 | 7/1977 | Nobusawa ......................... 354/23 D |
| 4,103,308 | 7/1978 | Sakurada et al. .................. 354/23 D |

Primary Examiner—Russell E. Adams
Attorney, Agent, or Firm—Oblon, Fisher, Spivak, McClelland & Maier

[57] ABSTRACT

The digital shutter control circuit comprises a reference clock pulse generating circuit, a binary counter circuit having a plurality of output stages each issuing, upon counting the pulses from the reference pulse generating circuit, output signals corresponding to the exposure time to be set in the shutter in terms of $2^n$ where n is an integer and a selector circuit connected to the shutter closing means and selectively connectable to any of the output stages. The binary counter circuit is actuated simultaneously with the actuation of the shutter opening means for opening the shutter so that the shutter closing means is actuated when the output signal is issued from the output stage to which the selector circuit is connected thereby closing the shutter to provide the selected shutter speed. The shutter control circuit incorporates an AND circuit the inputs of which are connected to at least two output stages selected from the plurality of output stages and the output is selectively connectable to the selector circuit so that, when connected, an exposure time is obtained which is intermediate the values obtained from the above selected two output stages. The exposure times may comprise the series of 1/1000 sec., 1/500 sec.-½ sec. and 1 sec. and the selected two output stages may be made 1/1000 sec. and 1/125 sec. so that substantially 1/114 sec. of the exposure time is obtained which exposure time is effective to insure the synchronization of an electric flash device with the shutter in which shutter opening and closing blades are actuated in parallel to the minor sides of the frames of 35 mm film.

6 Claims, 9 Drawing Figures

DIGITAL SHUTTER CONTROL CIRCUIT

BACKGROUND OF THE INVENTION

The present invention relates to a digital shutter control circuit and, more particularly, to a digital shutter control circuit capable of synchronizing an electric flash device with the actuation of the shutter at an exposure time as short as possible regardless of the series of exposure times set in the shutter.

Heretofore, a digital shutter control circuit has been proposed in which a binary counter circuit activated by clock pulses and having a plurality of output stages each having a different frequency divided time is incorporated and a selector circuit or a mechanical switch is adapted to selectively connect one of the output stages to the shutter operating mechanism thereby permitting the desired exposure time to be obtained corresponding to the selected output stage. In such a digital shutter control circuit, since any of the exposure times is determined by the frequency divided time based on the frequency of the clock pulses, the exposure times are limited to values in terms of $2^n$ where n is an integer, such as, for example, 1/1000 sec., 1/500 sec.,-½ sec. and 1 sec.

On the other hand, in a focal plane shutter having the opening and the closing blade thereof actuated in parallel to the minor sides of frames of 35 mm films, the time required to fully open the shutter by actuating the opening blade is about 7 m sec. and the time at which the closing blade is actuated when the shutter is set at 1/125 sec. is 7.8 m sec. after the opening blade has been actuated as shown in FIG. 1. Therefore, the period during which the shutter is actually held fully opened is about 0.8 m sec. The time period of the mechanical time lag of the closing of the X-contact of the shutter for an electric flash device, after the opening blade has been actuated, is about 0.5 m sec. Therefore, only about 0.3 m sec. is left until the closing blade commences to be actuated after the X-contact is closed. It is thus difficult in such a short time period to fully utilize the illumination of the flash device, i.e., to insure that the intensity of the illumination of the flash device reaches the peak thereof, resulting in uneven exposure of the film if a flash device having a relatively long duration of illumination is used. In order to avoid the above difficulties, the prior art shutter having flash synchronizing X-contact provides a prolonged exposure time of about 1/114 sec. as the nominal exposure time of 1/125 sec. which is within the allowable range in error of time given to the nominal exposure time of 1/125. sec.

However, in a shutter of the type described above utilizing a binary counter circuit, it is impossible to render only the exposure time of 1/125 sec. among the series of exposure times to be slightly longer than the nominal value of 1/125 sec. Therefore, in order to insure proper synchronization of a flash device with the shutter of the type described above, the exposure time must be set to the nomimal exposure time of 1/60 sec. This necessarily makes the range of possibility of using a flash device to be widely limited excluding conditions such as the flash synchronization under the bright daylight condition in which the exposure time must be selected as short as possible.

The present invention is proposed in light of the above described facts.

SUMMARY OF THE INVENTION

An object of the present invention is to provide a novel and useful digital shutter control circuit for use in a shutter having a binary counter circuit so as to provide a series of exposure times, each represented in terms of $2^n$, where n is an integer, which makes it possible to provide an exposure time intermediate the selected adjacent two exposure times in the series.

A further object is to provide a novel and useful digital shutter control circuit of the type described above, which makes it possible to insure the proper flash synchronization with the shutter at the minimum shutter speed even under the bright daylight condition by selectively prolonging only the selected one of the exposure time in the series.

The above object is achieved in accordance with the present invention by the provision of a digital shutter control circuit for an electric shutter having electrically operable shutter opening means and electrically operable shutter closing means, the digital shutter control circuit including a binary counter circuit having a plurality of output stages each adapted to issue an output signal upon activation thereof by a reference pulse generating circuit triggered by release means of the shutter simultaneously with the activation of the shutter opening means, each of the output signals corresponding to the respective one of series of exposure times set in the shutter represented in terms of $2^n$, where n is an integer, and a selector circuit selectively connectable to selected one of the output stages and connected to the shutter closing means, thereby permitting the desired exposure time, selected from the plurality of output signals connected to the selector circuit, to be obtained by the activation of the shutter closing means, the digital shutter control circuit being characterized by an AND circuit having its inputs connected to at least two output stages selected from the plurality of output stages and its output adapted to be selectively connectable to the selector circuit, thereby permitting an exposure time to be obtained by connecting the output to the selector circuit which exposure time is other than any of the series of exposure times.

In accordance with a characteristic feature of the present invention, the shutter may be a focal plane shutter of the type in which the shutter opening means and the shutter closing means are actuated in the direction parallel to the minor sides of frames of a 35 mm film, and the series of exposure time corresponding to $2^n$ include at least substantially 1/1000 sec., 1/500 sec.,-½ sec. and 1 sec., the inputs of the AND circuit being connected to the output stages corresponding to 1/1000 sec. and 1/125 sec., respectively, thereby permitting substantially 1/114 sec. of the exposure time to be obtained when the selector circuit is connected to the output of the AND circuit which exposure time insures the proper synchronization of an electric flash device with the shutter even under a bright daylight condition.

In accordance with a further characteristic feature of the present invention, the shutter may be made a focal plane shutter of the type in which the shutter opening means and the shutter closing means are actuated in the direction parallel to the major sides of frames of a 35mm film, and the series of exposure times corresponding to $2^n$ include at least substantially 1/1000 sec., 1/500 sec.-½ sec. and 1 sec., the inputs of the AND circuit being connected to the output stages corresponding to 1/1000 sec., 1/500 sec. and 1.125 sec., respectively, thereby permitting substantially 1/93 sec. of the exposure time to be obtained when the selector circuit is connected to the output of the AND circuit which exposure time insures the proper synchronization of an electric flash device with the shutter even under a bright daylight condition.

In like manner, an exposure time intermediate selected adjacent two exposure times in the series can be obtained by connecting the inputs of the AND circuits to the output stages corresponding to the selected adjacent two exposure times.

DETAILED DESCRIPTION OF THE PREFERRED EMBODIMENTS

Figure 1:
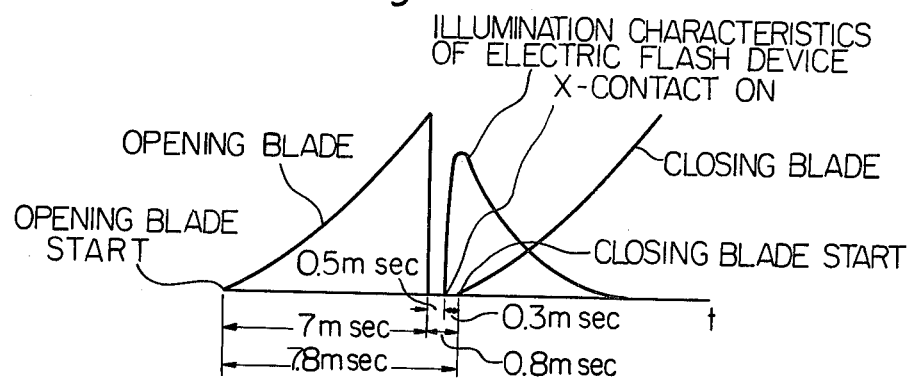
FIG. 1 is a diagram showing the actuation of the opening blade and the closing blade of a focal plane shutter actuated in the direction in parallel to minor sides of frames of 35 mm film at the exposure time of 1/125 sec. together with the illumination characteristics of an electric flash device.

Referring to FIG. 1 showing the relationship of the actuation between the opening blade and the closing blade of an electric focal plane shutter adapted to be moved in parallel to the minor sides of frames of 35 mm film set to the exposure time of 1/125 sec., i.e., 7.8 m sec. together with the relationship to the illumination characteristics of an electric flash device actuated in synchronism with the shutter by the actuation of the synchronizing X-contact.

As described previously, the duration of the fully opened state of the shutter is only 0.8 m sec. after the opening blade has been fully opened (requiring 7 m sec. from the start of actuation thereof) until the closing blade commences to start for completing the exposure time of 1/125 sec. (7.8 m sec. after the opening blade has been actuated), and the mechanical time lag of the commencement of illumination of the flash device after the X-contact has been closed is about 0.5 m sec. Therefore, only 0.3 m sec. is left for achieving the maximum illumination of the flash device during the fully opened state of the shutter. Thus, it is very difficult to achieve the proper synchronized illumination of the flash device when the exposure time is set to 1/125 sec., because the duration of major illumination of the flash device might be prolonged until after the start of the closing blade, resulting in uneven exposure of the film. Thus, the exposure time of 1/60 sec. is required in order to insure the proper synchronization of the flash device which, however, makes it impossible to carry out flash photography under a bright daylight condition.

Figure 2:
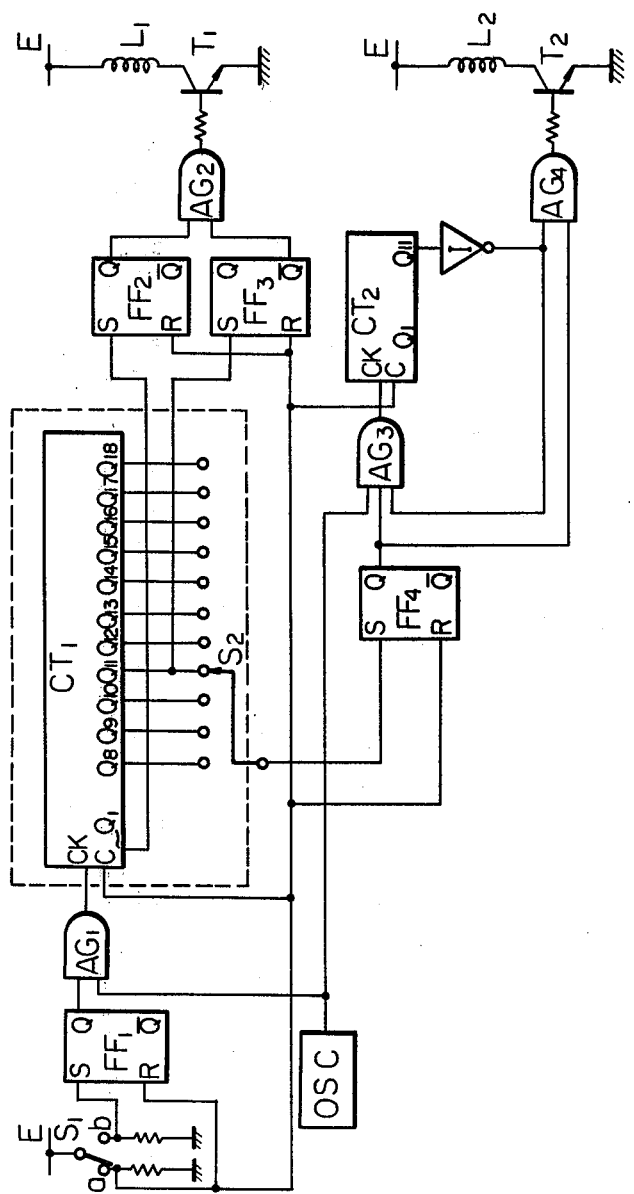
FIG. 2 is a wiring diagram showing an example of a digital shutter control circuit having a binary counter circuit to which the present invention is applied.

FIG. 2 shows an example of a digital shutter control circuit having a binary counter circuit suitable to be used with the present invention.

The circuit shown in FIG. 2 comprises an electric source E to which a movable contact of switch $S_1$ having two stationary contacts a, b is connected. Each of the contacts is grounded through a resistor. The contact a is connected to the reset input terminal R each of the first, the second, the third and the fourth flip flops $FF_1$, $FF_2$, $FF_3$ and $FF_4$ as well as to the clear input terminal C each of the first and the second binary counter circuits $CT_1$ and $CT_2$, thereby resetting and clearing these flip-flops and binary counter circuits when the switch $S_1$ is switched to the contact a.

The set input terminal S of the first flip-flop $FF_1$ is connected to the contact b of the switch $S_1$, while the non-inverted output Q of the flip-flop $FF_1$ is connected to one input terminal of an AND gate $AG_1$ the other input terminal of which is connected to an oscillator OSC adapted to issue reference clock pulses having the frequency T of $1/131KH_Z$. The output of the AND gate $AG_1$ is connected to the count input terminal CK of the first binary counter circuit $CT_1$. The counter circuit $CT_1$ has a plurality of output stages $Q_1$, $Q_8$, $Q_9$,-$Q_{18}$. The output stage $Q_1$ is adapted to issue an inverted output signal at the time the output of the AND gate $AG_1$ is applied to the count input terminal CK of the counter circuit $CT_1$, while the output stages $Q_8$, $Q_9$,-$Q_{18}$ are adapted to successively issue, after issuance of the inverted output from the output stage $Q_1$, inverted output signals at times each corresponding to 1/1000 sec., 1/500 sec.,-½ sec. and 1 sec. by virtue of the frequency $1/131kH_Z$ of the clock pulses of the oscillator OSC.

In other words, each of the output stages $Q_8$, $Q_9$, $Q_{10}$,-$Q_{18}$ issues an inverted high level signal in the manner as follows:

The counter $CT_1$ is triggered by the descending portion of the wave form of the clock pulse as it is applied from the oscillator OSC to the counter $CT_1$, so that an inverted high level signal is issued from the output stage $Q_1$. The output stage $Q_n$ (n = 8, 9,-18) is adapted to issue an inverted high level signal at the time $T_n$ given by the following equation after the issuance of the signal from the output stage $Q_1$:

$$T_n = T\{2^{(n-1)} - 1\}$$

where $T = 1/131KH_Z$

Therefore, each of the output stages $Q_8$, $Q_9$,-$Q_{18}$ issues the inverted high level signal at the time substantially 1/1000 sec., 1/500 sec., 1/250 sec.,-½ sec. or 1 sec., respectively.

The output stage $Q_1$ is connected to the set input terminal S of the second flip-flop $FF_2$ and the output stages $Q_8$, $Q_9$,-$Q_{18}$ are adapted to be selectively connected to a selector switch $S_2$ which is connected to the set input terminal S of the flip-flop $FF_4$ the operation of which will be described later.

The non-inverted output terminal Q of the flip-flop $FF_2$ is connected to one input terminal of an AND gate $AG_2$ the other input terminal of which is connected to the inverted output terminal $\overline{Q}$ of the third flip-flop $FF_3$ while the output of the AND gate $AG_2$ is connected through a resistor to the base of a transistor $T_1$ having its collector connected through a coil $L_1$ of a shutter opening electromagnet to the electric source E and its emitter grounded.

When the coil $L_1$ is energized, the electromagnet thereof is actuated to release the opening blade of the shutter for opening the shutter. The set input terminal S of the flip-flop $FF_3$ is connected to the output stage $Q_{11}$ (1/125 sec.), for example.

The non-inverted output terminal Q of the flip-flop $FF_4$ is connected to one of the three input terminals of an AND gate $AG_3$ and the second input terminal thereof is connected to the oscillator OSC while the third input terminal is connected to the output of an inverter circuit I which is connected to the output stage $Q_{11}$ of the second binary circuit $CT_2$, for example, similar in function with that of the counter circuit $CT_1$ (issuing an inverted output signal after 1/125 sec.). The output of the AND gate $AG_3$ being contacted to the count input terminal CK of the counter circuit $CT_2$.

The output terminal of the inverter circuit I and the non-inverted output terminal Q of the flip-flop $FF_4$ are connected to the respective input terminals of an AND gate $AG_4$ the output of which is connected through a resistor to the base of a transistor $T_2$ having its emitter grounded and its collector connected to the electric source E through a coil $L_2$ of an electromagnet adapted to actuate the closing blade for closing the shutter when the coil $L_2$ is energized.

In operation of the above described shutter control circuit, the switch $S_1$ is first held in contact with the contact a so that all the flip-flop $FF_1$ to $FF_4$ are held reset while the binary counter circuits $CT_1$ and $CT_2$ are held cleared.

Assuming that the selector switch $S_2$ is connected to the output stage $Q_{11}$ (for 1/125 sec.), the switch $S_1$ is switched to the contact b for the operation of the shutter so that the reset inputs to the flip-flops $FF_1$ to $FF_4$ and the clear inputs to the counter circuits $CT_1$ and $CT_2$ are released and all the flip-flops $FF_1$ to $FF_4$ are ready to issue outputs from their non-inverted output terminals Q or inverted terminals $\overline{Q}$ when their set input terminals S receive signals, respectively, and all the binary counter circuits $CT_1$ and $CT_2$ are ready to commence counting operation when their count input terminals CK receive signals, respectively. Since the set input terminal S of the flip-flop $FF_1$ directly receives a high level signal from the electric source $E_x$ through the contact b, the flip-flop $FF_1$ is actuated to issue an inverted high level signal from its non-inverted output terminal Q which is applied to one of the inputs of the AND gate $AG_1$ thereby opening the same permitting the reference clock pulses from the oscillator OSC to be applied from the output of the AND gate $AG_1$ to the count input terminal CK of the binary counter circuit $CT_1$. Thus, the inverted high level signal from the output stage $Q_1$ is applied to the set input terminal S of the flip-flop $FF_2$ thereby applying a high level signal from the non-inverted output terminal Q thereof to one of the inputs of the AND gate $AG_2$. Since the other input of the AND gate $AG_2$ is receiving a high level signal from the inverted output terminal $\overline{Q}$ of the flip-flop $FF_3$ which is still held non-activated, a high level signal from the output of the AND gate $AG_2$ is applied through the resistor to the base of the transistor $T_1$ thereby rendering it to be conductive to energize the coil $L_1$ so that the opening blade of the shutter is opened at the same time as the switch $S_1$ is switched to the contact b for the operation of the shutter.

After the shutter has been opened, the output stage $Q_{11}$ of the counter $CT_1$ issues an inverted high level signal just 1/125 sec. after the output stage $Q_1$ has issued the inverted high level output signal. The inverted high level signal issued from the output stage $Q_{11}$ is applied through the selector switch $S_2$ to the set input terminal S of the flip-flop $FF_4$ so that the high level output signal is issued from the non-inverted output terminal Q thereof, which is applied to one of the inputs of the AND gate $AG_4$. Since the other of the inputs of the AND gate $AG_4$ is connected to the output of the inverter circuit I, the input of which is connected to the output stage $Q_{11}$ of the binary counter circuit $CT_2$, which is still held non-activated, the output of the inverter circuit I is held at high level. Therefore, the AND gate $AG_4$ is activated to issue a high level output signal which is applied through the resistor to the base of the transistor $T_2$ so as to render the same to be conductive thereby energizing the coil $L_2$ for actuating the closing blade just 1/125 sec. after the opening blade has been opened to complete the exposure of 1/125 sec.

In order to deenergize the coils $L_1$ and $L_2$ after they have been energized to actuate the opening or closing blade, the output signal from the output stage $Q_{11}$ of the counter circuit $CT_1$ is applied to the set input terminal S of the flip-flop $FF_3$ so that the output from the inverted output terminal $\overline{Q}$ of the flip-flop $FF_3$ is rendered to be low level to shut the AND gate $AG_2$ thereby deenergizing the coil $L_1$. The duration of the energization of the coil $L_1$ is not limited to be 1/125 sec. but it may be varied insofar as the actuation of the opening blade is insured by the energization of the coil $L_1$.

Similarly, the deenergization of the coil $L_2$, after it has been energized for actuating the closing blade, is effected through the counter circuit $CT_2$. That is, when the high level output signal from the non-inverted output terminal Q of the flip-flop $FF_4$ is applied to the input of the AND gate $AG_3$, the AND gate $AG_3$ is opened so that the clock pulses from the oscillator OSC are passed to the count input terminal CK of the counter circuit $CT_2$ for triggering the same, because, at this time, the output of the invertor circuit I, connected to the input of the AND gate $AG_3$, is held at a high level. Thus 1/125 sec. after the closing blade has been actuated, the output stage $Q_{11}$ of the counter circuit $CT_2$ issues an inverted high level output signal which is inverted through the invertor circuit I, and the inverted low level signal is applied to the AND gate $AG_4$ to shut the same thereby rendering the transistor $T_2$ to be non-conductive to deenergize the coil $L_2$, while, at the same time, the inverted low level output signal of the invertor circuit I is applied to the input of the AND gate $AG_3$ thereby closing the same to deactivate the counter circuit $CT_2$.

The input of the invertor circuit I may be connected to any output stage of the counter circuit $CT_2$ other than the output stage $Q_{11}$ insofar as positive actuation of the closing blade is insured by the energization of the coil $L_2$.

Figure 3:
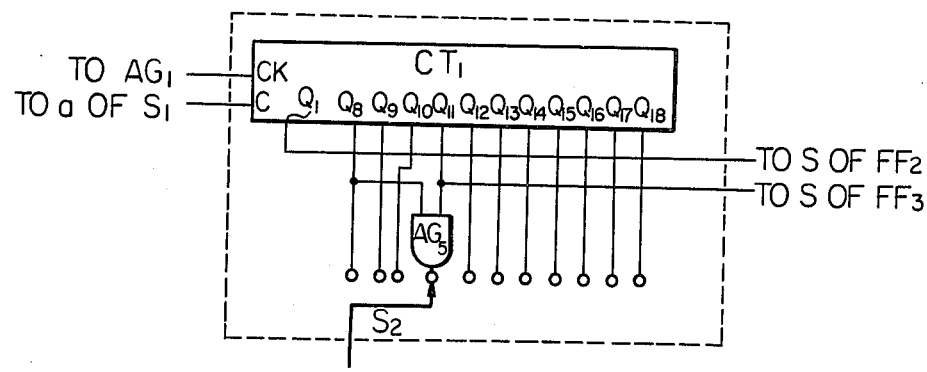
FIG. 3 is a fragmentary wiring diagram showing an embodiment of the present invention applied to the shutter control circuit of FIG. 2.

The present invention makes it possible to slightly prolong only the exposure time of 1/125 sec. in the series of 1/1000 sec., 1/500 sec.,-½ sec. and 1 sec., within the allowable limit of the nominal value thereof, in order to positively insure the proper synchronization of an electric flash device with the shutter by using X-contact thereof when the shutter is set to the nominal exposure time of 1/125 sec., i.e., the shortest exposure time for the flash synchronization with a shutter having the opening and closing blades actuated in parallel to the minor sides of frames of 35 mm film for enabling bright daylight flash synchronization, as shown in FIG. 3.

FIG. 3 corresponds to the portion encircled by broken line in FIG. 2, the remaining portions of the circuit being identical with FIG. 2.

As shown in FIG. 3, an AND gate $AG_5$ is provided having one of the inputs thereof connected to the output stage $Q_8$ (1/1000 sec.) of the counter circuit $CT_1$ and the other input connected to the output stage $Q_{11}$ (1/125 sec.) while the output is adapted to be selectively connectable to the selector switch $S_2$. Therefore, an output is issued from the output of the AND gate $AG_5$ when the output stage $Q_{11}$ issues an inverted high level output signal (1/125 sec. of the triggering of the counter circuit $CT_1$) and, thereafter, the output stage $Q_8$ issues an inverted high level output signal by about 1/1000 sec. (more particularly, 0.98 m sec. $= T \times 2^{8-1}$ ($T = 1/131 KH_Z$)). The output of the AND gate $AG_5$ is applied through the selector switch $S_2$ to the set input terminal of the flip-flop $FF_4$ thereby closing the closing blade as previously described, so that the exposure time of 1/114 sec. $= 8.79$ m sec. is obtained. This value is within the allowable limit of the nominal exposure time of 1/125 sec. and insures the proper synchronization of a flash device even under a bright daylight condition.

Figure 4:
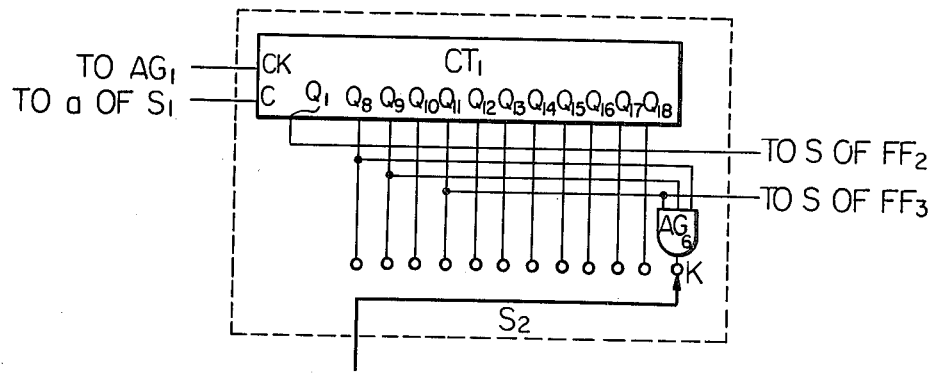
FIG. 4 is a fragmentary wiring diagram similar to FIG. 3 but showing another embodiment of the present invention.

FIG. 4 shows another embodiment applied to a focal plane shutter wherein the opening and closing blades are actuated in the direction parallel to the major sides of frames of 35 mm film so that the proper flash synchronization can not be achieved by the usual shortest exposure time for flash synchronization. In such a shutter, the time required from the starting of the actuation of the opening blade until it is fully opened is about 9 m sec., thereby requiring the exposure time of about 1/90 sec. as the shortest flash synchronization shutter time. As shown in FIG. 4, a further contact K is provided so as to be selectively connected to the selector switch $S_2$, and one of the three inputs of an AND gate $AG_6$ is connected to the output stage $Q_8$ (1/1000 sec.) and another of the three inputs of the AND gate $AG_6$ is connected to the output stage $Q_9$ (1/1500 sec.), while the remaining input of the AND gate $AG_6$ is connected to the output stage $Q_{11}$ (1/125 sec). The output of the AND gate $AG_6$ is connected to the contact K.

Thus, when the selector switch $S_2$ is connected to the contact K, the output of the AND gate $AG_6$ is inverted to high level at $1/125 + T(2^{8-1} + 2^{9-1}) = 10.74$ m sec. (where $T = 1/131 KH_Z$), so that the exposure time of 10.74 m sec. $= 1.93$ sec. is obtained, in like manner as in the case of FIG. 3, which insures the proper flash synchronization even under a bright daylight condition.

The embodiment of FIG. 3 may be modified so that a further contact K (similar to that in FIG. 4) is provided which is connected to the AND gate $AG_5$ for providing a flash synchronizing exposure time of 1/114 sec., while the proper exposure time of 1/125 sec. is obtained by connecting the output stage $Q_{11}$ directly to the selector switch $S_2$.

As described above, in accordance with the present invention, any intermediate exposure time between the series of exposure times set in a shutter may be obtained by providing at least an AND gate between the binary counter circuit and the selector switch and the inputs of the AND gate are connected at least to two output stages selected from the series of the output stages providing the series of the exposure times while the output of the AND gate is connectable to the selector switch.

Figure 5:
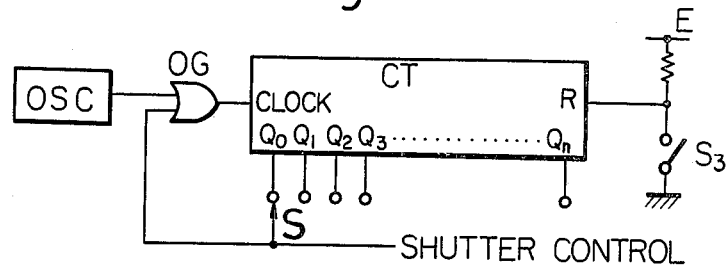
FIG. 5 is a wiring diagram showing another example of a digital shutter control circuit having a binary counter circuit to which the present invention is applied.

FIG. 5 shows another example of the shutter control circuit applicable to the present invention. As shown, the oscillator OSC is connected through an OR gate OG to the clock pulse input terminal of the binary counter circuit CT the reset input terminal R of which is connected to the junction between a resistor connected to the electric source E and a release switch $S_3$ which is grounded at the opposite terminal. The other input of the OR gate OG is connected to the selector switch S.

When the switch $S_3$ is closed, the reset input signal is released from the reset input terminal R of the counter circuit CT so that the same is triggered to commence the counting of the clock pulses from the oscillator OSC.

Assuming that the times from the closure of the switch $S_3$ until the respective output stages $Q_0, Q_1, -Q_n$ are inverted to issue high level signals which are $T_0, T_1, T_2, -T_n$ and the time $T_1$ is $2^{-m}$ sec., then the time $T_2$ is given by $2^{1-m}$, $T_3$ is $2^{2-m}$-$T_n$ is $2^{(n-1)-m}$.

The intermediate time $T_i'$ between the time $T_i$ and the time $T_{i+1}$ is :

$$T_i' = \frac{T_i + T_i + 1}{2} \quad (i = 1, 2, \cdots n)$$

$$T_i = 2^{(i-1)-m}$$

$$\frac{T_i}{2} = 2^{(i-1)-m-1} = 2^{(i-2)-m} = T_{i-1}$$

Thus, $$\frac{T_i}{2} = T_{i-1}$$

$$\frac{T_i + 1}{2} = T_i$$

$$T_i' = T_{i-1} + T_i$$

Figure 6:
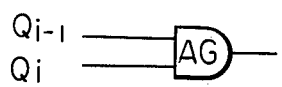
FIG. 6 is a fragmentary wiring diagram showing the connection of an AND circuit in the wiring diagram of FIG. 5 in accordance with the present invention for obtaining an intermediate exposure time.
Figure 7:
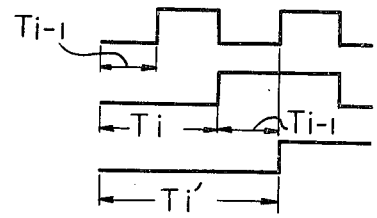
FIG. 7 is a diagram showing the various wave forms of the output signals of the binary counter circuit for obtaining and intermediate exposure time according to FIG. 6.

This means that the intermediate time $T_i'$ is obtained by the output of an AND gate the inputs of which are connected to the output stages $Q_{i-1}$ and $Q_i$, respectively, as shown in FIGS. 6 and 7.

Figure 8:
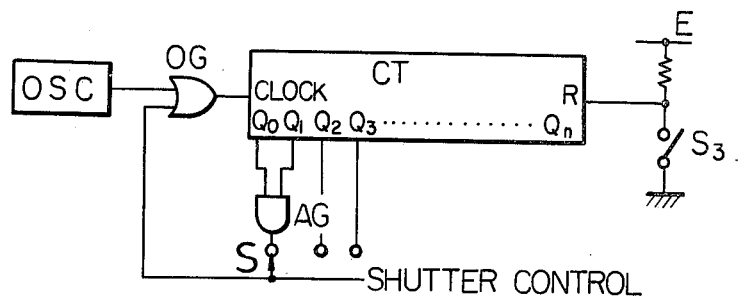
FIG. 8 is a wiring diagram showing an embodiment of the present invention utilizing the shutter control circuit of FIG. 5.

FIG. 8 shows an example of how to obtain an intermediate time between the outputs from the output stages $Q_0$ and $Q_1$ by providing an AND gate AG having the inputs connected to the output stages $Q_0, Q_1$, and the output connected to the selector switch S.

The value m is set to 10, then the output of the output stage $Q_0$ is 1/1000 ($T_1/10$) while the output of the output stage $Q_1$ is 1/500 ($T_1/9$). The intermediate time $T_1'$ is 1.46 m sec. ($T_1/9.42$) which is equal to 1/683 sec.

In like manner, if the inputs of the AND gate AG are connected to the output stages $Q_1$ and $Q_2$, then the resultant intermediate time $T_2'$ is 2.93 m sec. (1/336 sec.).

Figure 9:
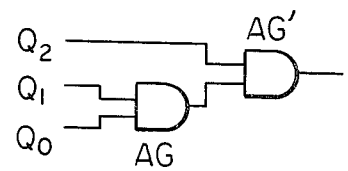
FIG. 9 is a fragmentary wiring diagram showing a modification of FIG. 8.

FIG. 9 shows a further modification of the present invention. This example includes a further AND gate AG' with one input connected to the output stage $Q_2$ and the other input connected to the output of the AND gate AG while the output of the AND gate AG' is connectable to the selector switch S.

In this case the resultant intermediate time $T_2''$ is 3.42 m sec. (1/293 sec.).

In like manner, various intermediate times may be obtained in accordance with the present invention.

We claim:

1. Digital shutter control circuit for an electric shutter having electrically operable shutter opening means and electrically operable shutter closing means, said digital shutter control circuit including a binary counter circuit having a plurality of output stages each adapted to issue an output signal upon activation thereof by a reference clock pulse generating circuit triggered by release means of said shutter simultaneously with the activation of said shutter opening means, each of said output signals corresponding to the respective one of series of exposure times set in said shutter represented in terms of $2^n$ where n is an integer, and a selector circuit selectively connectable to selected one of said output stages and connected to said shutter closing means, thereby permitting the desired exposure time selected from said plurality of output signals connected to said selector circuit to be obtained by the activation of said shutter closing means, wherein the improvement comprises an AND circuit having its inputs connected to at least two output stages selected from said plurality of output stages and its output adapted to be selectively connectable to said selector circuit, thereby permitting an intermediate exposure time to be obtained by connecting said output to said selector circuit which exposure time is other than any of said series of exposure times.

2. Digital shutter control circuit according to claim 1, wherein said shutter is a focal plane shutter of the type in which said shutter opening means and said shutter closing means are actuated in the direction parallel to the minor sides of frames of a 35 mm film, and said series of exposure times corresponding to said $2^n$ include at least substantially 1/1000 sec., 1/500 sec.,-½ sec. and 1 sec., said inputs of said AND circuit being connected to the output stages corresponding to 1/1000 sec. and 1/125 sec., respectively, thereby permitting substantially 1/114 sec. of the exposure time to be obtained when said selector circuit is connected to said output of said AND circuit which exposure time insures the proper synchronization of an electric flash device with said shutter.

3. Digital shutter control circuit according to claim 1, wherein said shutter is a focal plane shutter of the type in which said shutter opening means and said shutter closing means are actuated in the direction parallel to the major sides of frames of a 35 mm film, and said series of exposure times corresponding to said $2^n$ include at least substantially 1/1000 sec., 1/500 sec.,-½ sec. and 1 sec., said inputs of said AND circuit being connected to the output stages corresponding to 1/100 sec., 1/500 sec. and 1/125 sec., respectively, thereby permitting substantially 1/93 sec. of the exposure time to be obtained when said selector circuit is connected to said output of said AND circuit cuit which exposure time insures the proper synchronization of an electric flash device with said shutter.

4. Digital shutter control circuit according to claim 3, wherein said output of said AND circuit is connected to a further terminal selectively connectable to said selector circuit other than terminals each directly connected to the respective output stage of said binary counter circuit adapted to be selectively connectd to said selector circuit.

5. Digital shutter control circuit for an electric shutter including an electric source, electrically operable shutter opening means, electrically operable shutter closing means, a reference pulse generating circuit, a binary counter circuit having a plurality of output stages each adapted to issue upon activation thereof by connecting said electric source an output signal corresponding to the respective one of series of exposure times to be set in said shutter represented in terms of $2^n$ where n is an integer, and a selector circuit, said shutter opening means being so connected to said electric source that it is actuated simultaneously with the energization of said binary counter circuit thereby opening said shutter, said selector circuit being connected to said shutter closing means and adapted to be selectively connected to selected one of said output stages of said binary counter circuit thereby permitting the desired exposure time in said series of exposure times to be obtained by the actuation of said shutter closing means effected by the output signal applied thereto through said selector circuit, wherein the improvement comprises an AND circuit having its inputs connected to selected two adjacent output stages in said plurality of output stages of said binary counter circuit and its output adapted to be selectively connectable to said selector circuit, thereby permitting an exposure time to be obtained by connecting said output to said selector circuit which exposure time is of the value intermediate those of said selected two adjacent output stages.

6. Digital shutter control circuit according to claim 5, further comprising a further AND circuit having inputs connected to said output of said first mentioned AND circuit as well as to a further output stage immediately succeeding said selected two adjacent output stages in said series of output stages.

* * * * *